(12) United States Patent
Xu

(10) Patent No.: US 8,485,764 B2
(45) Date of Patent: Jul. 16, 2013

(54) CUTTING INSERT, CUTTING TOOL, AND METHOD OF MANUFACTURING MACHINED PRODUCT USING THE SAME

(75) Inventor: Yongbo Xu, Yasu (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/499,649

(22) PCT Filed: Sep. 30, 2010

(86) PCT No.: PCT/JP2010/067151
§ 371 (c)(1),
(2), (4) Date: Mar. 30, 2012

(87) PCT Pub. No.: WO2011/052340
PCT Pub. Date: May 5, 2011

(65) Prior Publication Data
US 2012/0189396 A1    Jul. 26, 2012

(30) Foreign Application Priority Data

Oct. 28, 2009 (JP) ................................. 2009-248018
Apr. 27, 2010 (JP) ................................. 2010-101622

(51) Int. Cl.
*B23C 5/202* (2006.01)
(52) U.S. Cl.
USPC .......................................... 407/113; 407/114
(58) Field of Classification Search
USPC .................................. 407/113, 114, 115, 116
See application file for complete search history.

(56) References Cited

U.S. PATENT DOCUMENTS

| | | | | |
|---|---|---|---|---|
| 4,681,488 A | * | 7/1987 | Markusson | 407/114 |
| 6,217,263 B1 | * | 4/2001 | Wiman et al. | 407/114 |
| 6,244,791 B1 | * | 6/2001 | Wiman et al. | 407/114 |
| 6,733,212 B2 | * | 5/2004 | Nagaya et al. | 407/34 |
| 7,008,148 B2 | * | 3/2006 | Wiman et al. | 407/113 |
| 7,547,164 B2 | * | 6/2009 | Hessman | 407/113 |
| 8,113,746 B2 | * | 2/2012 | Koga | 407/113 |

FOREIGN PATENT DOCUMENTS

| | | |
|---|---|---|
| JP | 2002-178210 | 6/2002 |
| JP | 2006-075913 | 3/2006 |
| JP | 2007-229858 | 9/2007 |
| JP | 2009-208221 | 9/2009 |
| JP | 2009-226577 | 10/2009 |
| JP | 2010-523353 | 7/2010 |
| WO | WO 2008/120188 A2 | 10/2008 |

* cited by examiner

*Primary Examiner* — Will Fridie, Jr.

(57) ABSTRACT

A cutting insert according to an embodiment of the present invention includes an upper surface; a lower surface; a side surface; and a cutting edge which is located in an intersection region of the upper surface and the side surface, and includes a major cutting edge, a flat cutting edge, and a minor cutting edge located between the major cutting edge and the flat cutting edge. The cutting edge reaches a top portion thereof while being inclined upward from the flat cutting edge to the major cutting edge with respect to a reference plane perpendicular to a central axis of the cutting insert in a side view. The cutting edge is thereafter inclined downward with respect to the reference plane. A peripheral cutting edge angle of the minor cutting edge is larger than a peripheral cutting edge angle of the major cutting edge. A cutting tool including the cutting insert; and a method of manufacturing a machined product using the cutting tool are provided.

21 Claims, 13 Drawing Sheets

(a)

(b)

(c)

(a)

(b)

(c)

CUTTING INSERT, CUTTING TOOL, AND METHOD OF MANUFACTURING MACHINED PRODUCT USING THE SAME

TECHNICAL FIELD

The present invention relates to a cutting insert, a cutting tool, and a method of manufacturing a machined product using the same.

BACKGROUND ART

As an example of cutting inserts used for face milling cutters and end mills, for example, Japanese Unexamined Patent Publication No. 2010-523353 discloses a double-sided cutting insert including a major cutting edge 50 and a minor cutting edge 52.

However, when this cutting insert is attached to a holder, there is a risk that a region having a negative axial rake angle occurs in the vicinity of an upper end 58 of the major cutting edge 50, thus causing the problem that cutting resistance is increased in the region.

Hence there is a desire for a cutting insert that can further reduce the cutting resistance than conventional ones.

SUMMARY OF THE INVENTION

An object of the present invention is to provide a cutting insert and a cutting tool, which have both high cutting edge strength and low cutting resistance characteristics and hence produce a satisfactory machined surface, and a method of manufacturing a machined product using the cutting tool.

Another object of the present invention is to provide a cutting insert and a cutting tool, which have both excellent cutting capability and chip discharge performance, and a method of manufacturing a machined product using the cutting tool.

A cutting insert according to one embodiment of the present invention includes an upper surface; a lower surface; a side surface; and a cutting edge which is located in an intersection region of the upper surface and the side surface, and includes a major cutting edge, a flat cutting edge, and a minor cutting edge located between the major cutting edge and the flat cutting edge. The cutting edge includes sequentially an ascending portion inclined upward from the flat cutting edge to the major cutting edge with respect to a reference plane perpendicular to a central axis of the cutting insert; a top portion connected to the ascending portion; and a descending portion connected to the top portion and inclined downward with respect to the reference plane in a side view. A peripheral cutting edge angle of the minor cutting edge is larger than a peripheral cutting edge angle of the major cutting edge.

In a cutting insert according to another embodiment of the present invention, the upper surface includes a rake surface located inward the cutting edge. The side surface includes a first side surface, a second side surface, and a third side surface which are located sequentially in a direction along the cutting edge. The flat cutting edge is located in an intersection region of the third side surface and the upper surface. The minor cutting edge is located in an intersection region of the second side surface and the upper surface, and is inclined at an inclination angle $\theta 1$ with respect to the flat cutting edge in a top view. The major cutting edge is located in an intersection region of the first side surface and the upper surface, and is inclined at an inclination angle $\theta 2$ with respect to the flat cutting edge in the top view. The rake surface includes a first rake surface including a first major rake surface and a first minor rake surface which are inclined downward at a rake angle $\alpha$ with respect to the reference plane from a side of the cutting edge toward an inward portion. The first major rake surface is located inward the major cutting edge, and the first minor rake surface is located inward the minor cutting edge. An inward side in the first minor rake surface is inclined at an inclination angle $\theta 3$ with respect to the minor cutting edge, and an inward side in the first major rake surface is inclined at an inclination angle $\theta 4$ with respect to the major cutting edge in the top view. The inclination angles $\theta 1$ to $\theta 4$ satisfy relationships of $\theta 1 > \theta 2$ and $\theta 3 < \theta 4$.

A cutting tool according to one embodiment of the present invention includes the cutting insert and a holder configured to attach the cutting insert thereto.

A method of manufacturing a machined product according to one embodiment of the present invention includes rotating the cutting tool; bringing the cutting edge of the rotating cutting tool into contact with a workpiece; and separating the cutting tool from the workpiece.

In the cutting insert according to one embodiment, the cutting edge includes sequentially the ascending portion, the top portion, and the descending portion, in a direction from the flat cutting edge to the major cutting edge in the side view. It is therefore capable of improving cutting edge strength. Further, besides the major cutting edge, the minor cutting edge having the larger peripheral cutting edge angle than the major cutting edge is interposed between itself and the flat cutting edge. It is therefore capable of reducing cutting resistance. As a result, vibration occurrence is reduced even in high speed cutting, such as high feed, and hence cutting edge fracture is reduced, thereby achieving life extension of the cutting insert and a satisfactory machined surface.

In the cutting insert according to another embodiment of the present invention, owing to the major cutting edge and the minor cutting edge, excellent cutting capability can be exhibited under wide cutting conditions. Since the cutting edge and the first rake surface satisfy the relationships of $\theta 1 > \theta 2$ and $\theta 3 < \theta 4$, chips can be appropriately curled according to their respective sizes under the wide cutting conditions, namely, in the range from low depth of cut using only the minor cutting edge to high depth of cut using both the minor cutting edge and the major cutting edge. It is therefore capable of improving chip discharge performance.

BRIEF DESCRIPTION OF THE DRAWINGS

FIG. 4(*b*) is an enlarged sectional view taken along the line B-B of FIG. 2; FIG. 4(*c*) is an enlarged sectional view taken along the line C-C of FIG. 2;

FIG. 6(*b*) is an enlarged view of major portion in FIG. 6(*a*);

FIG. 8(*b*) is an enlarged sectional view taken along the line E-E of FIG. 6(*b*);

PREFERRED EMBODIMENTS FOR CARRYING OUT THE INVENTION

<Cutting Insert>

First Embodiment

A first embodiment of the cutting insert (hereinafter referred to as an "insert" in some cases) according to the present invention is described in detail below with reference to FIGS. 1 to 4.

Figure 1:
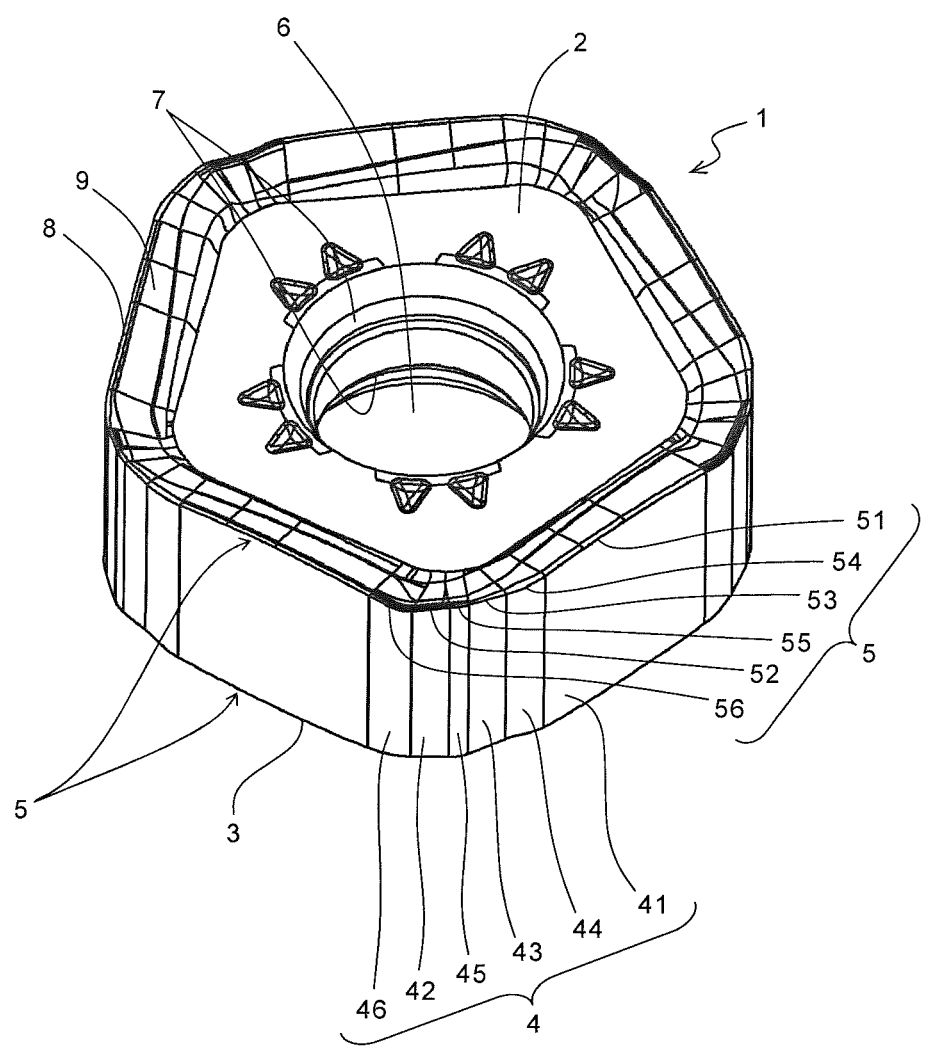
FIG. 1 is a perspective view showing a cutting insert according to a first embodiment of the present invention.

The insert 1 includes a substantially polygonal plate shaped body as shown in FIG. 1. No particular limitation is imposed on the shape of the body. That is, the body may have a certain shape usually employed by those skilled in the art, such as triangle, quadrangle, pentagon, hexagon, and octagon in a top view. In the present embodiment, the body has a substantially pentagonal shape, and hence there are merits that it is easy to form a minor cutting edge in addition to a major cutting edge, and it is easy to ensure a relatively large seating surface, as described later.

The body is preferably made of a cemented carbide substrate, a cermet substrate, or the like. A PVD film or CVD film formed by PVD method or CVD method, or a composite film of these is preferably formed on the surface of these substrates. In particular, a structure having the PVD film formed on the surface of the cemented carbide substrate is suitable in the machining necessitating chipping resistance, such as when cutting steel, stainless steel, or ductile cast iron. A structure having the CVD film formed on the surface of the cemented carbide substrate is suitable in the machining necessitating wear resistance, such as high-speed cutting of gray cast iron. A structure having the PVD film formed on the surface of the cermet substrate is suitable in finishing.

The body includes an upper surface 2, a portion of which has a function of a so-called rake surface; a lower surface 3, a portion of which has a function as an attachment surface with respect to a holder; and a side surface 4, a portion of which has a function as a so-called flank surface. The side surface is continuous with the upper surface 2 and the lower surface 3. A cutting edge 5 is formed in an intersection region of the upper surface 2 and the side surface 4.

A through hole 6 that allows an attachment screw to pass through extends from the upper surface 2 to the lower surface 3. The through hole 6 is centrally located on the upper surface 2, and is configured to extend through the body. A step part inside the through hole 6 is a contact part 7 to be engaged with the head of the attachment screw. The contact part 7 is formed at upper and lower parts so that the insert 1 can be reversely fixed thereto.

Figure 3:
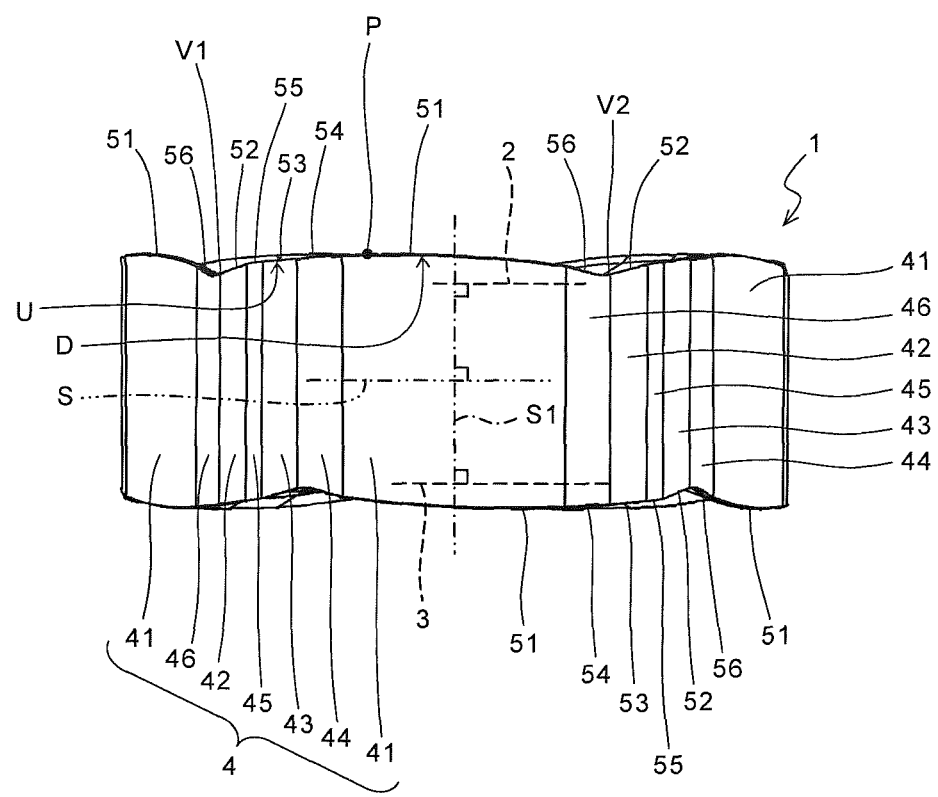
FIG. 3 is a side view of the cutting insert in FIG. 1.

In the insert 1, the side surface 4 is connected vertically to the upper surface 2 and the lower surface 3 (refer to FIG. 3). That is, the insert 1 is a negative type insert allowing both the upper surface 2 and the lower surface 3 to be used as a rake surface. Accordingly, five corners on each surface of the insert 1 or, in other words, ten corners on both surfaces thereof are usable for cutting. In this case, the cutting edge 5 is also formed along an intersection region of the lower surface 3 and the side surface 4. When using the cutting edge 5 closed to the lower surface 3, the lower surface 3 is used as the surface (upper surface) functioning as the rake surface, and the upper surface 2 is used as the surface (lower surface) functioning as the seating surface. In another embodiment, the insert 1 may be configured not to include the cutting edge 5 close to the lower surface 3. Even in this case, five corners close to the upper surface 2 are usable for cutting. In yet another embodiment, the insert 1 may be a so-called positive type insert configured to impart a clearance angle to the side surface 4.

Figure 2:
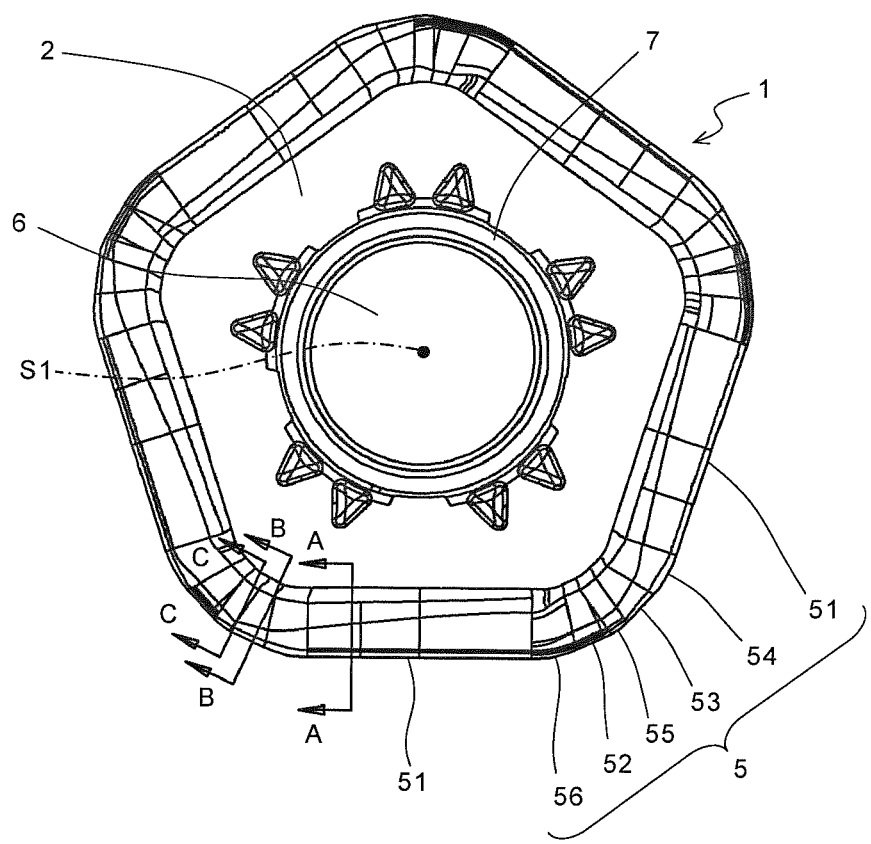
FIG. 2 is a plan view of the cutting insert in FIG. 1.

As shown in FIGS. 2 and 3, the cutting edge 5 includes a major cutting edge 51, a flat cutting edge 52, and a minor cutting edge 53 disposed therebetween. Correspondingly, the side surface 4 includes a major side surface 41 having the major cutting edge 51 formed on the upper end thereof; a flat side surface 42 having the flat cutting edge 52 formed on the upper end thereof; and a minor side surface 43 which is disposed between these two side surfaces, and has the minor cutting edge 53 formed on the upper end thereof. In the present embodiment, a connecting surface (corner surface) 44 is formed between the major side surface 41 and the minor side surface 43, and a first corner cutting edge 54 is formed on the upper end of the connecting surface 44. A connecting surface (corner surface) 45 is formed between the flat side surface 42 and the minor side surface 43, and a second corner cutting edge 55 is formed on the upper end of the connecting surface 45. The major side surface 41 used for another cutting process is continuous through the connecting surface 46 with respect to a side of the flat side surface 42 opposite the connecting surface 45. A third corner cutting edge 56 is formed on the upper end of the connecting surface 46. Thus, in the present embodiment, the cutting edge 5 is formed over the entire circumference of the intersection region of the upper surface 2 and the side surface 4, and cutting edge regions used for the individual cutting processes are continuous with each other.

The cutting edge 5 includes sequentially an ascending portion U inclined upward from the flat cutting edge 52 to the major cutting edge 51 with respect to a reference plane S perpendicular to a central axis S1 of the insert 1, a top portion P connected to the ascending portion U, and a descending portion D connected to the top portion P and inclined downward with respect to the reference plane S. In the present specification, the term "top portion" corresponds to a portion, such as a point or region located at the highest position in the cutting edge 5 with respect to the reference plane S. In the present embodiment, the top portion P is located at the major cutting edge 51. The present embodiment is specifically described below.

The major cutting edge 51 plays a major role in generating chips during cutting action. The major cutting edge 51 is formed longer than other cutting edges, namely, the flat cutting edge 52 and the minor cutting edge 53. As seen from FIG. 3, the major cutting edge 51 provides a gentle upward convex curve in a side view.

In the present embodiment, the top portion P is located close to the minor cutting edge 53 than the middle part in the major cutting edge 51. That is, the top portion P is located in the middle of the major cutting edge 51. Therefore, the major cutting edge reaches the top portion P thereof while being inclined upward with respect to the reference plane S perpendicular to the central axis S1 of the insert 1 in the vicinity of an end of the major cutting edge 51 close to the minor cutting edge 53 in a direction away from the minor cutting edge 53 in the side view. Thereafter, the convex curve is inclined downward with respect to the reference plane S in the direction away from the minor cutting edge 53.

With the above configuration, when the insert 1 is attached to the holder (refer to FIG. 9), the axial rake angle of the major cutting edge 51 with respect to a rotation axis S2 of the holder 81 is apt to become negative. In the present embodiment, however, the minor cutting edge 53 having a large peripheral cutting edge angle as described later is disposed between the flat cutting edge 52 and the major cutting edge 51, thereby reducing cutting resistance in a region where the axial rake angle is apt to become negative. Additionally, compared to conventional inserts including only the major cutting edge and including no minor cutting edge, the cutting edge region has a so-called two-stage structure by interposing the minor cutting edge 53. Hence, the peripheral cutting edge angle of the major cutting edge 51 itself can be set relatively large, thereby effectively reducing the cutting resistance of the major cutting edge 51. Consequently, the cutting resistance of the cutting edge 5 (the major cutting edge 51 and the minor cutting edge 53) contributing to cutting can be effectively reduced as a whole.

The flat cutting edge 52 is formed for the purposes of smoothing a machined surface of a workpiece and improving accuracy of the machined surface of the workpiece. The flat cutting edge 52 is in a substantially linear shape in a top view (refer to FIG. 2), and is inclined upward toward the minor cutting edge 53 with respect to the reference plane S in a side view (refer to FIG. 3).

The minor cutting edge 53 is a cutting edge having a larger peripheral cutting edge angle than the major cutting edge 51, and is disposed for the purpose of assisting the cutting by the major cutting edge 51, such as mitigating the cutting resistance of the major cutting edge 51, or reducing damage to the major cutting edge 51.

In the present specification, the term "peripheral cutting edge angle" denotes an inclination angle of the cutting edge with respect to a rotation axis of the holder when the insert is attached to the holder. For example, in a cutting tool 80 shown in FIG. 10, an angle θ51 formed by a line parallel to the rotation axis S2 of the holder 81 and the major cutting edge 51 is the peripheral cutting edge angle of the major cutting edge 51. Similarly, an angle θ53 formed by the line L and the minor cutting edge 53 is the peripheral cutting edge angle of the minor cutting edge 53.

The peripheral cutting edge angle of the major cutting edge 51 is set to, for example, approximately 0-60°, and the peripheral cutting edge angle of the minor cutting edge 53b is set to an angle larger than that, for example, approximately 60-80°. In consideration of the cutting edge damage or fracture, the peripheral cutting edge angle of the minor cutting edge 53 is preferably set to be not less than 1.2 times, preferably not less than 1.5 times larger than the peripheral cutting edge angle of the major cutting edge 51. The minor cutting edge 53 merely needs to be located between the major cutting edge 51 and the flat cutting edge 52, and a plurality of minor cutting edges may be disposed therebetween.

As shown in FIG. 3, the minor cutting edge 53 is located between the flat cutting edge 51 and the major cutting edge 51, and directly or indirectly connects the two. In the present embodiment, the minor cutting edge 53 is inclined upward toward the major cutting edge 51 with respect to the reference plane S.

The entirety of the cutting edge 5 close to the upper surface 2, which includes the flat cutting edge 52, the minor cutting edge 53, and the major cutting edge 51, is the gentle upward convex curve in the side view, as shown in FIG. 3. In a general view of the cutting edge 5, it is the lowest in the vicinity of a boundary V1 of the third corner cutting edge 56 and the flat cutting edge 52, and is gradually inclined upward with respect to the reference plane S as it proceeds therefrom in the circumferential direction (anticlockwise direction in FIG. 2) to the flat cutting edge 52, the second corner cutting edge 55, the minor cutting edge 53, the first corner cutting edge 54, and the major cutting edge 51. Then, it is the highest at the top portion P, and is gradually inclined downward with respect to the reference plane S as it further proceeds from the top portion P in the circumferential direction, and again becomes the lowest in the vicinity of a boundary V2 of the next third corner cutting edge 56 and the next flat cutting edge 52.

The cutting edge 5 close to the lower surface 3 is in a shape obtained by reversing the cutting edge 5 close to the upper surface 2 so that the insert 1 can be used in its upside-down state. That is, the respective cutting edges on the upper and lower surfaces have a rotationally symmetric relationship to each other around a line perpendicular to the paper surface of FIG. 3. Although in this case, the major cutting edge 51 is formed on a lower end of a major side surface 41 as shown on the right side of FIG. 3, not the flat cutting edge 52 but the minor cutting edge 53 is formed on a lower end of a flat side surface 42. Similarly, not the minor cutting edge 53 but the flat cutting edge 52 is formed on a lower end of the minor side surface 43. Corner cutting edges 56, 55, and 54 are respectively formed among the cutting edges 51, 52, and 53. Therefore, the length of the flat side surface 42 and the length of the minor side surface 43 are preferably substantially the same. Similarly, the length of the connecting 44 being continuous with the left side of the major side surface 41 and the length of a connecting surface 46 being continuous with the opposite side are preferably substantially the same.

No special limitation, except for the above point, is imposed on the lengths of the major cutting edge 51, the flat cutting edge 52, and the minor cutting edge 53. For example, the ratio of the length of the major cutting edge 51 and the length of the minor cutting edge 53 is approximately 2:1 to 10:1, preferably 2:1 to 6:1. No special limitation is imposed on the lengths of the flat cutting edge 52 and the minor cutting edge 53. However, when using the insert in its upside-down state, the length ratio of the two is substantially 1:1. When designing the negative type insert, or when even the positive type insert is not intended for use in its reverse state, the length ratio of the flat cutting edge 52 and the minor cutting edge 53 can be set relatively freely, for example, 1:1 to 1:6.

The corner cutting edges 54, 55, and 56 take the shape of a curved line in a top view, as shown in FIG. 2. No special limitation is imposed on the radii of curvature of these corner cutting edges. For example, the first corner cutting edge 54 and the third corner cutting edge 56 have substantially the same length and radius of curvature, and the second corner cutting edge 55 is interposed between the flat cutting edge 52 and the minor cutting edge 53, thus taking the shape of a gentle curved line. With this configuration, considerable variation in chip thickness can be reduced between the major cutting edge 51 that has a small peripheral cutting edge angle and therefore increases the chip thickness, and the minor cutting edge 53 that has a large peripheral cutting edge angle and therefore decreases the chick thickness. This achieves a smooth discharge of chips holding a stable shape. This also reduces stress concentration in a boundary region of the major cutting edge 51 and the minor cutting edge 53 during cutting process, thereby effectively reducing the probability that the insert 1 is broken from the boundary region. For example, when the minor cutting edge 53 and the major cutting edge 51 are continuous with each other through the first corner cutting edge 54, load exerted on the boundary of the minor cutting edge 53 and the major cutting edge 51 during the cutting process can be diffused by the first corner cutting edge 54, thereby reducing fracture of the cutting edge 5 in the boundary.

Figure 4:
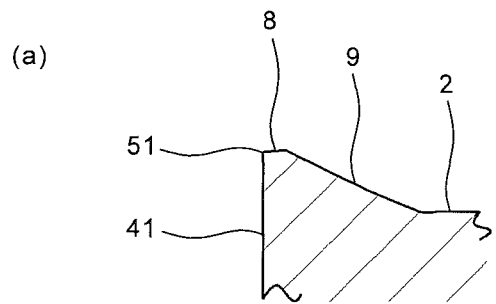
FIG. 4(*a*) is an enlarged sectional view taken along the line A-A of FIG. 2.
Figure 4:
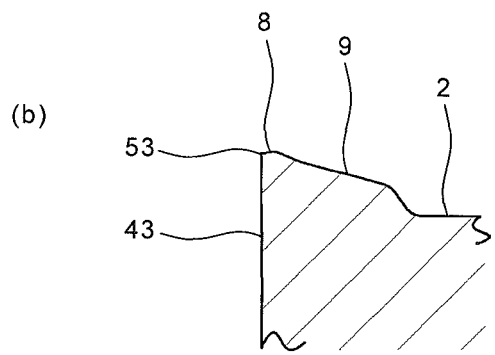
Figure 4:
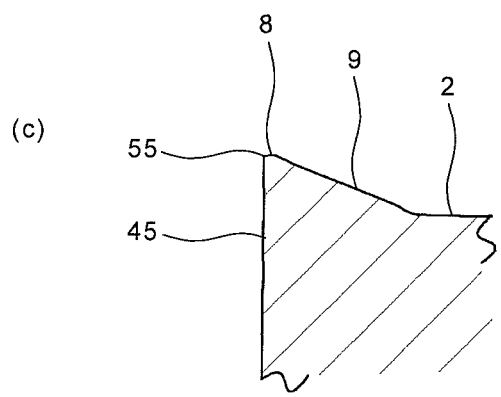

On the other hand, as shown in FIG. 4, the upper surface 2 is provided with land portions 8 each being made up of a narrow width flat surface along the cutting edge 5. That is, a narrow region between each of the cutting edges 51, 52, and 53, and their respective corresponding rake surface 9 is the land portion 8. The widths of the land portions 8 are suitably set mainly from the viewpoint of the strengths of the corresponding cutting edges 51 to 56. The widths of the land portions 8 are usually set at substantially a constant value. The rake surface 9 is inclined downward with respect to the reference plane S in a direction from the inward end of the land portion 8 to a centrally located flat surface. In the present specification, the term "inward" denotes a side that is oriented toward the central axis S1 of the insert 1.

A breaker groove corresponding to the major cutting edge 51 may be formed on the upper surface 2. The breaker groove is formed for the purpose of facilitating curling of the chips generated by the major cutting edge 51. A cross-sectional shape including the breaker groove cut in a direction perpendicular to the major cutting edge 51 takes a concave shape.

Second Embodiment

A second embodiment of the insert according to the present invention is described in detail with reference to FIGS. 5 to 8. In FIGS. 5 to 8, the same components as the foregoing FIGS. 1 to 4 are identified by the same reference numerals, and the description thereof is omitted here.

Figure 5:
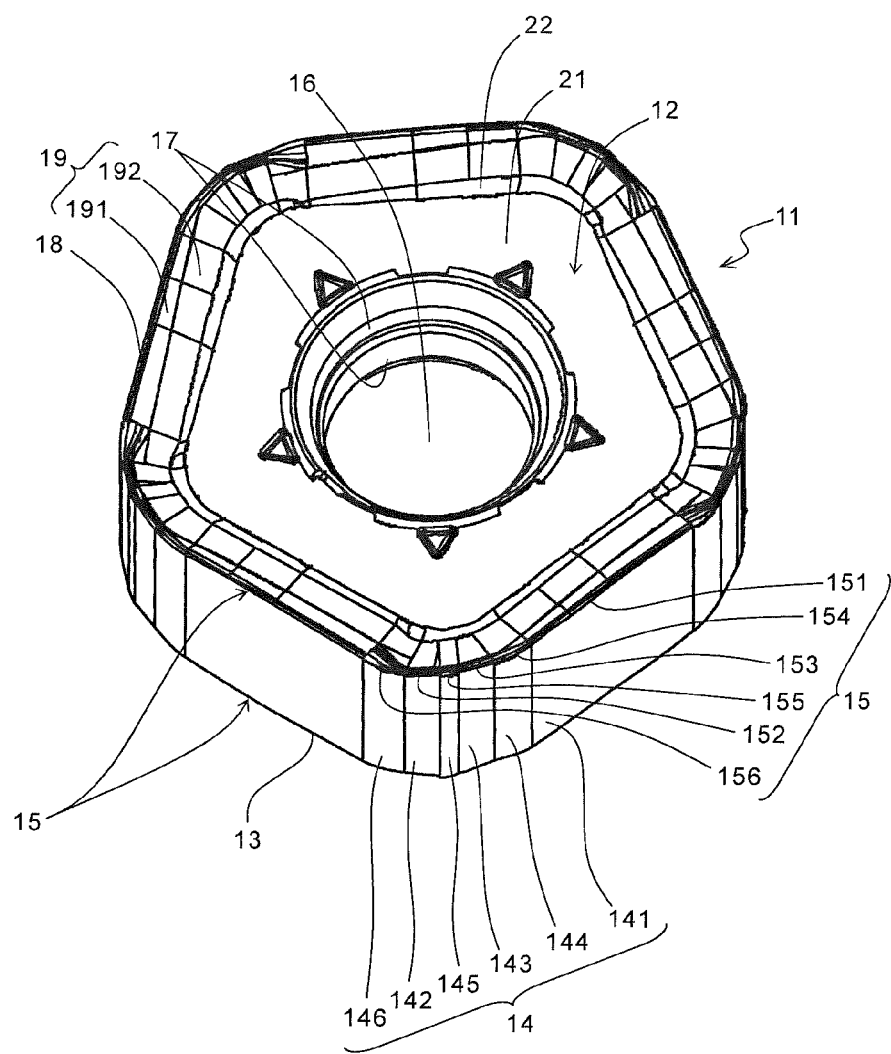
FIG. 5 is a perspective view showing a cutting insert according to a second embodiment of the present invention.

As shown in FIG. 5, the insert 11 of the present embodiment includes a substantially polygonal planar body. In the present embodiment, the body takes a substantially pentagonal shape having five long sides.

The body includes an upper surface 12, a portion of which has a function of a so-called rake surface; a lower surface 13, a portion of which has a function as an attachment surface with respect to a holder; and a side surface 14, a portion of which has a function as a so-called flank surface. The side surface is continuous with the upper surface 12 and the lower surface 13. A cutting edge 15 is formed in an intersection region of the upper surface 12 and the side surface 14.

A through hole 16 that allows an attachment screw to pass through extends from the upper surface 12 to the lower surface 13. The through hole 16 is centrally located on the upper surface 2, and is configured to extend through the body. A step part inside the through hole 16 is a contact part 17 to be engaged with the head of the attachment screw. The contact part 17 is formed at upper and lower parts so that the insert 11 can be reversely fixed thereto.

The upper surface 12 includes narrow width land portions 18 along the cutting edge 15, and also includes a first rake surface 191 and a second rake surface 192 corresponding to the cutting edge 15.

Figure 7:
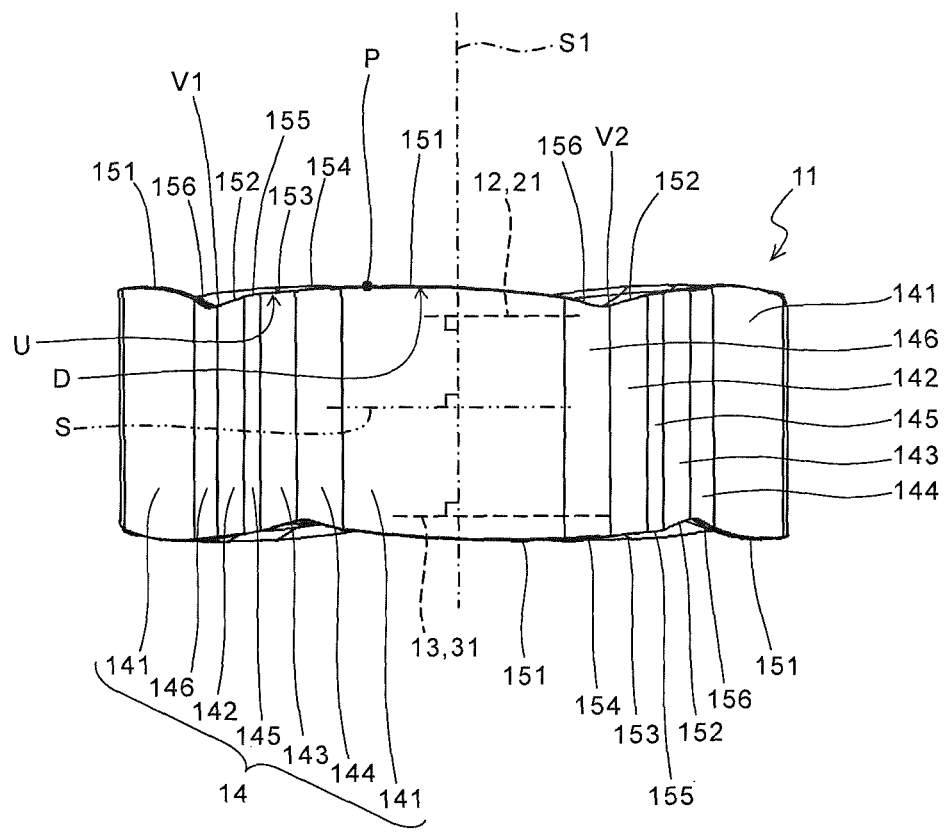
FIG. 7 is a side view of a cutting insert in FIG. 5.

In the insert 11, the side surface 14 is connected perpendicularly to the upper surface 12 and the lower surface 13 (refer to FIG. 7). That is, the insert 11 is a negative type cutting insert that both the upper surface 12 and the lower surface 13 are usable as a rake surface. Therefore in the insert 11, the cutting edge 15 is also formed in an intersection region of the lower surface 13 and the side surface 14.

As shown in FIG. 5, the side surface 14 includes a first side surface 141, a second side surface 143, and a third side surface 142 which are sequentially located adjacent to each other in a direction along the cutting edge 15. The cutting edge 15 includes a major cutting edge 151 located in an intersection region of the first side surface 141 and the upper surface 12; a minor cutting edge 153 located in an intersection region of the second side surface 143 and the upper surface 12; and a flat cutting edge 152 located in an intersection region of the third side surface 142 and the upper surface 12.

In the present embodiment, the first side surface 141, the second side surface 143, and the third side surface 142 are continuous with each other through corner surfaces 144 and 145, and the major cutting edge 151, the minor cutting edge 153, and the flat cutting edge 152 are continuous with each other through corner cutting edges 154 and 155. The first side surface 141 used for another cutting process is continuous through the corner surface 146 with respect to a side of the third side surface 142 opposite the corner surface 145. An upper end of the corner surface 146 is a corner cutting edge 156.

The major cutting edge 151 plays a major role in generating chips during cutting action, particularly during high depth of cut. In the present embodiment, a top portion P is located in the middle of the major cutting edge 151 (refer to FIG. 7) similarly to the first embodiment. Therefore, the major cutting edge reaches the top portion P thereof while being inclined upward with respect to a reference plane S perpendicular to a central axis S1 of the insert 11 in the vicinity of an end of the major cutting edge 151 close to the minor cutting edge 153 in a direction away from the minor cutting edge 153 in a side view. Thereafter, the major cutting edge is inclined downward with respect to the reference plane S in the direction away from the minor cutting edge 153. Other configurations of the major cutting edge 151 are similar to those of the major cutting edge 51 according to the first embodiment.

Figure 13:
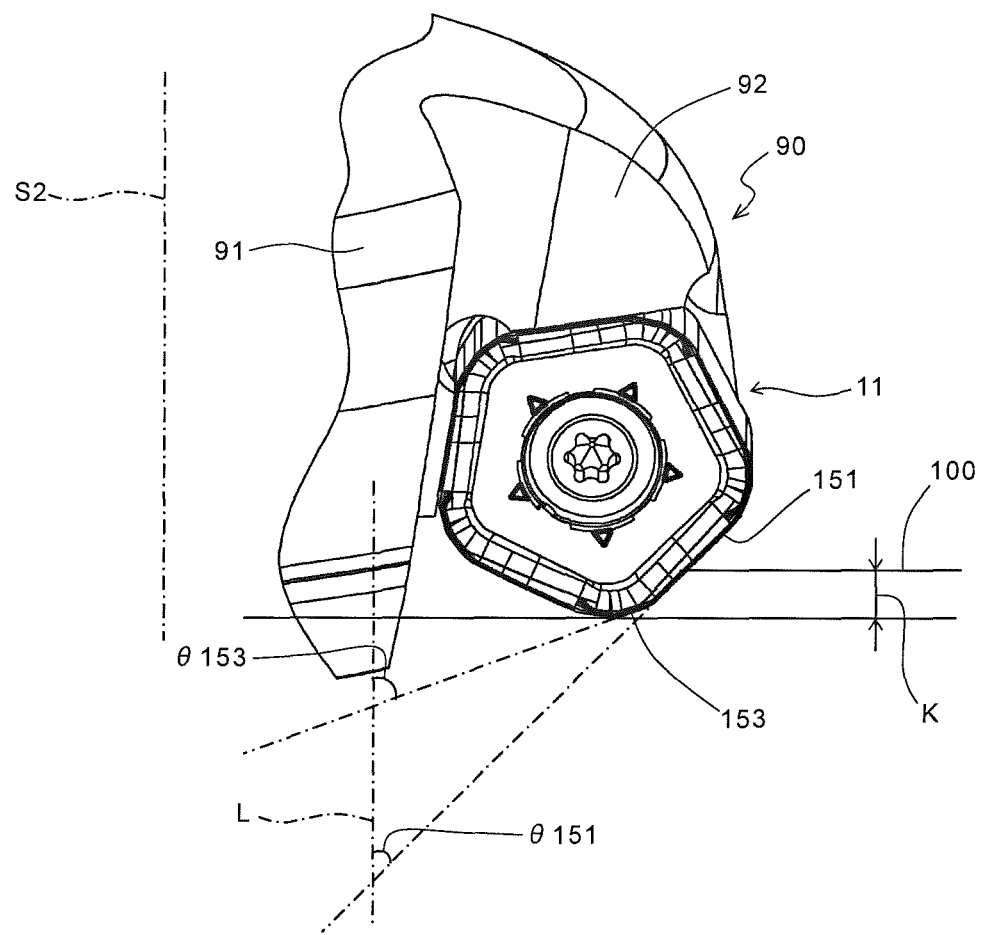
FIG. 13 is an enlarged view of major portion of the cutting tool in FIG. 12.

The configuration of the flat cutting edge 152 is similar to that of the flat cutting edge 52 according to the first embodiment. As shown in FIG. 13, the peripheral cutting edge angle (θ153) of the minor cutting edge 153 is preferably set to be not less than 1.2 times, preferably not less than 1.5 times larger than the peripheral cutting edge angle (θ151) of the major cutting edge 151. Other configurations of the minor cutting edge 153 are similar to those of the minor cutting edge 53 according to the first embodiment. The configurations of the corner cutting edges 154, 155, and 156 are similar to those of the corner cutting edges 54, 55, and 56 according to the first embodiment.

The insert 11 of the present embodiment is a double-sided insert. Therefore, the cutting edge 15 close to the lower surface 13 is in a shape obtained by reversing the cutting edge 15 close to the upper surface 12 so that the insert 11 can be used in its upside-down state. That is, the respective cutting edges 15 on the upper and lower surfaces have rotational symmetry around a line perpendicular to the paper surface of FIG. 7, similarly to the first embodiment. Although the major cutting edge 151 is formed on a lower end of the first side surface 141 as shown on the right side of FIG. 7, not the flat cutting edge 152 but the minor cutting edge 153 is formed on a lower end of the third side surface 142. Further, not the minor cutting edge 153 but the flat cutting edge 152 is formed on a lower end of the second side surface 143. Corner cutting edges 156, 155, and 154 are respectively formed among the cutting edges 151, 152, and 153. Therefore, the length of the third side surface 142 and the length of the second side surface 143 are preferably substantially the same. Similarly, the length of the corner surface 144 being continuous with the left side of the first side surface 141 and the length of the corner surface 146 being continuous with the opposite side are preferably substantially the same.

Figure 8:
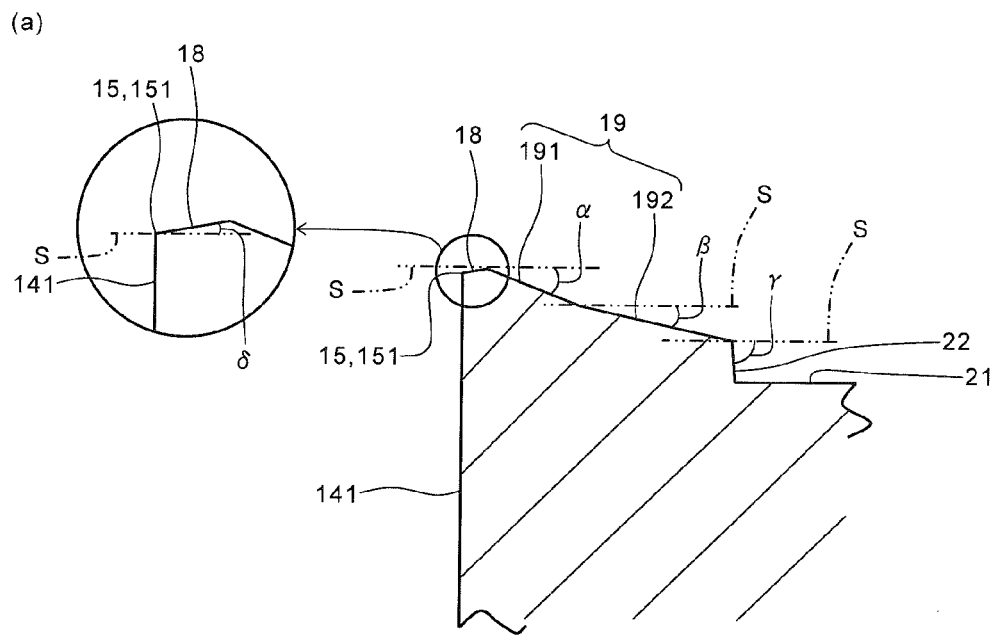
FIG. 8(*a*) is an enlarged sectional view taken along the line D-D of FIG. 6(*a*)
Figure 8:
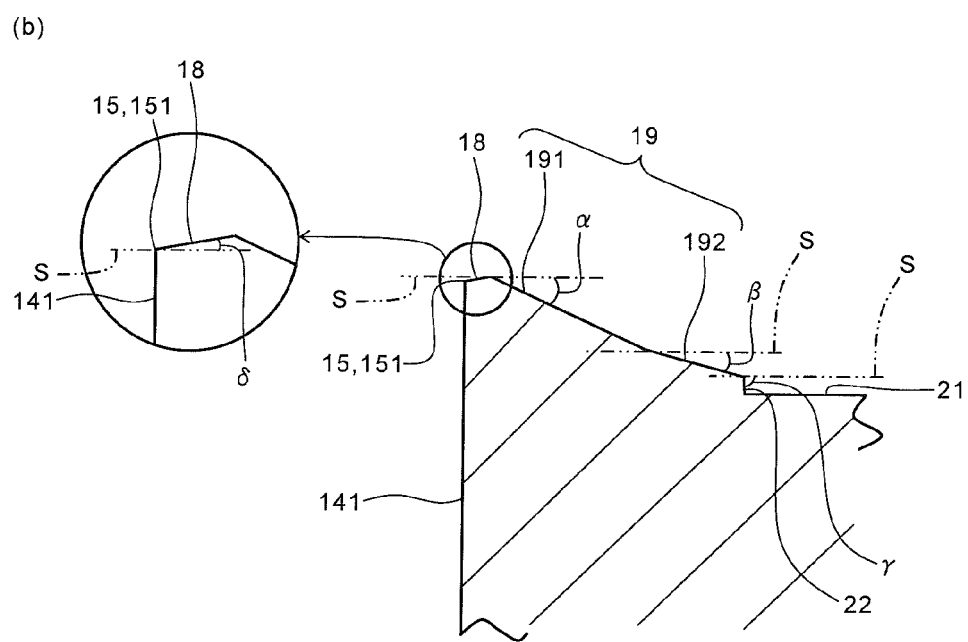

On the other hand, the land portions 18 denote narrow regions between each of the cutting edges 151, 152, and 153, and their respective corresponding first rake surface 191, as described above. To be specific, as shown in FIG. 8, the land portion 18 is located between the cutting edge 15 and the first rake surface 191, and is inclined at a land angle δ toward inward the first rake surface 191 with respect to the reference plane S perpendicular to the central axis S1 of the insert 11. The land angle δ is smaller than a rake angle α of the first rake surface 191 described later. When the land portion 18 is inclined upward with respect to the reference plane S, the land angle δ is determined as being minus (−). The width of the land portion 18 may be suitably set in consideration of the strength of the corresponding cutting edge 15 (cutting edges 151 to 156). In the present embodiment, the width of the land portion 8 is set at substantially a constant value.

The rake surface 19 is located inward the major cutting edge 151 and the minor cutting edge 153. In the present embodiment, the rake surface 19 is formed along the entire cutting edge 15 as shown in FIG. 5. The rake surface 19 includes the first rake surface 191 and a second rake surface 192.

Figure 6:
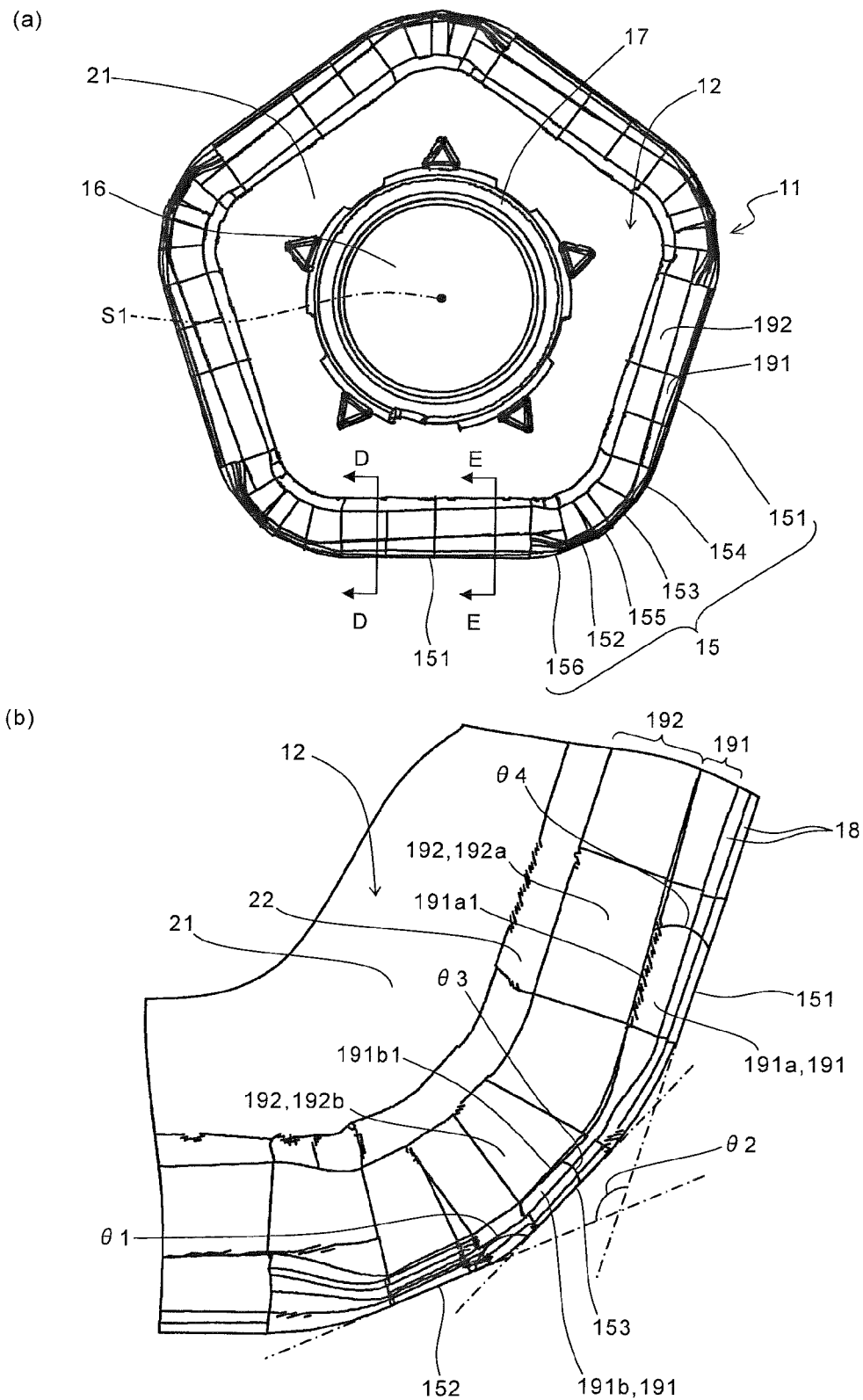
FIG. 6(*a*) is a plan view of the cutting insert in FIG. 5.

Referring to FIG. 6(*b*), the first rake surface 191 includes, on the upper surface 12, a first major rake surface 191*a* located inward the major cutting edge 151, and a first minor rake surface 191*b* located inward the minor cutting edge 153. As shown in FIG. 8, the first rake surface 191 is inclined downward at a rake angle α with respect to the reference plane S perpendicular to the central axis S1 of the insert 11 from a side of the cutting edge 15 toward an inward portion.

Referring again to FIG. 6(*b*), the second rake surface 192 is located inward the first rake surface 191, and includes, on the upper surface 12, a second major rake surface 192*a* located inward the first major rake surface 191*a*, and a second minor rake surface 192*b* located inward the first minor rake surface 191*b*. As shown in FIG. 8, the second rake surface 192 is inclined downward at a rake angle β with respect to the reference plane S from a side of the first rake surface 191 toward an inward portion.

Referring to FIG. 8, the rake angle β of the second rake surface 192 is set smaller than the rake angle α of the first rake surface 191 in a cross section perpendicular to the cutting edge 15. This permits appropriate chip curling, and allows the chips to be subsequently discharged passing through the first rake surface 191, the second rake surface 192, and a flat surface 21. In other words, both the first rake surface 191 and the second rake surface 192 are inclined downward with respect to the reference plane S. This reduces the probability that the chips are excessively curled and fed in the direction of travel of the cutting edge 15, thereby reducing the probability that the chips are caught between the cutting edge 15 and a workpiece 100. This effect is further enhanced when cutting a difficult-to-machine material, or under conditions of high feed per stroke.

To be specific, in the cross section perpendicular to the cutting edge 15, the first rake surface 191 and the second rake surface 192 are preferably set so that a difference between the rake angle α and the rake angle β exceeds 3°. Hereat, the rake angle means an angle formed by the first rake surface 191 and the second rake surface 192, and the reference plane S (flat surface 21) perpendicular to the central axis S1 of the insert 11. A downward inclination is determined as being plus (+). Unless otherwise noted, it indicates an angle in the cross section perpendicular to the cutting edge 15. Although the above-mentioned relationship is more preferably established in the entire region of the cutting edge 15, at least one of the major cutting edge 151 and the minor cutting edge 153 is preferably set so that the difference between the rake angle α and the rake angle β exceeds 3°. This provides the effect described above. It is especially effective that the above-mentioned relationship is established in the major cutting edge 151.

No special limitation is imposed on the ranges of the rake angle α and the rake angle β. However, from the viewpoint of improving chip discharge performance, they are preferably 5°<α and β<30°, more preferably 10°<α and β<25°. Alternatively, the rake angle α and the rake angle β may be respectively constant or changed (for example, both may be changed sequentially).

For example, when the rake angle α is set to become larger in a direction from the minor cutting edge 153 to the major cutting edge 151, cutting resistance can be reduced. Similarly, when the rake angle β is set to become larger in a direction from the minor cutting edge 153 to the major cutting edge 151, the chips take a helical shape, thus improving chip discharge performance. Further in the present embodiment, it is set so that a difference between a maximum value αMax of the rake angle α of the first rake surface 191 and a minimum value βMin of the rake angle β of the second rake surface 192 is larger than 10°. This configuration achieves a reduction in cutting resistance.

In the present embodiment, the minor cutting edge 153 is inclined at an inclination angle θ1 with respect to the flat cutting edge 152, and the major cutting edge 151 is inclined at an inclination angle θ2 with respect to the flat cutting edge 152 in a top view as shown in FIG. 6(*b*). An inward side 191*b*1 in the first minor rake surface 191*b* is inclined at an inclination θ3 with respect to the minor cutting edge 153, and an inward side 191*a*1 in the first major rake surface 191*a* is inclined at an inclination θ4 with respect to the major cutting edge 151 in the top view. The inclination angles θ1 to θ4 satisfy relationships of θ1>θ2 and θ3<θ4. Thereby, under a wide range of depth-of-cut conditions in the range from low depth of cut using only the minor cutting edge 153 to high depth of cut using the minor cutting edge 153 and the major cutting edge 151, the chips can be curled into a helical shape, thereby improving chip discharge performance.

Specifically, as shown in FIG. 6(*b*), the inward side 191*b*1 in the first minor rake surface 191*b* constitutes a boundary of the first minor rake surface 191*b* and the second minor rake surface 192*b*. The inward side 191*a*1 in the first major rake surface 191*a* constitutes a boundary of the first major rake surface 191*a* and the second major rake surface 192*a*.

Then, θ3=0°, namely, a distance from the minor cutting edge 153 to the inward side 191*b*1 in the first minor rake surface 191*b* is constant in the entire length region of the side 191*b*1 (minor cutting edge 153). In contrast, θ4>0°, namely, a distance from the major cutting edge 151 to the inward side 191*a*1 in the first major rake surface 191*a* becomes larger in a direction from the minor cutting edge 153 to the major cutting edge 151. These widths (distances) may be determined as a distance including the land portion 18 in the insert 11 including the land portion 18 as in the case of the present embodiment, and they mean the first rake surface width itself in the insert including no land portion. Hereat, the width and the distance mean a length in a direction perpendicular to the cutting edge 15.

A distance from the cutting edge 15 to the inward side of the rake surface 19 is constant in a region from the minor cutting edge 153 to the major cutting edge 151. Hereat, the region from the minor cutting edge 153 to the major cutting edge 151 includes not only a region between the minor cutting edge 153 and the major cutting edge 151, but a region itself corresponding to the minor cutting edge 153 and the major cutting edge 151. Accordingly, the width of the second rake surface 192 becomes narrower in a direction from the minor cutting edge 153 to the major cutting edge 151. This configuration ensures a large area of the flat surface 21 (the surface functioning as a seating surface), thereby improving attachment stability of the insert 11 during cutting.

In the present embodiment, the flat surface 21 is located inward the second rake surface 192 on the upper surface 12, and is located lower than the second rake surface 192 in the sectional view perpendicular to the cutting edge 15 (refer to FIG. 8). This configuration reduces the probability that chips come into contact with the flat surface (seating surface) 21. Hereat, the flat surface 21 is not required to have the above-mentioned relationships over the entire region of the cutting edge 15, but is required to have the above-mentioned relationships in at least a partial region of the cutting edge 15. The partial region is preferably a portion of the major cutting edge 151 apart from the corresponding flat cutting edge 152. A flat surface 31 located on the lower surface 13 has a similar configuration to the flat surface 21 (refer to FIG. 7).

A wall surface 22 exists between the flat surface 21 and the second rake surface 192. Specifically, as shown in FIG. 8, the wall surface 22 is located between the flat surface 21 and the second rake surface 192 on the upper surface 12, and is connected to the flat surface 21 and the second rake surface 192, and is inclined downward at a chip clearance angle γ with respect to the reference plane S from a side of the cutting edge 15 toward an inward portion. The chip clearance angle γ is larger than the rake angle β. This ensures a large area of the flat surface (seating surface) 21, thereby improving the attachment stability of the insert 11 during cutting. The chip clearance angle γ is preferably 90° or less.

At least one of the first rake surface 191 and the second rake surface 192 may be a plane or curved surface. Alternatively, the first rake surface 191 and the second rake surface 192 may be connected to each other through a curved intermediate rake surface. The term "plane" is a concept including not only planes in the strict sense of the word but also slight irregularities and curves as long as they perform the function of the plane. The same is true for the curved surface. Other configurations are similar to those of the insert 1 of the first embodiment, and therefore the description thereof is omitted here.

<Cutting Tool>

First Embodiment

Figure 9:
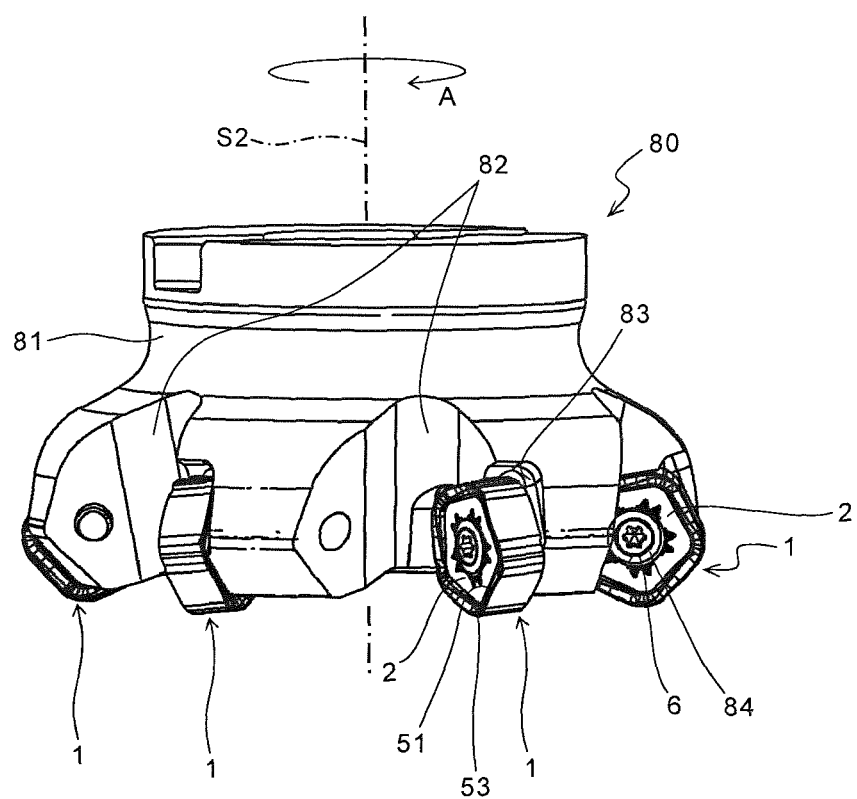
FIG. 9 is a side view showing a cutting tool according to a first embodiment of the present invention.
Figure 10:
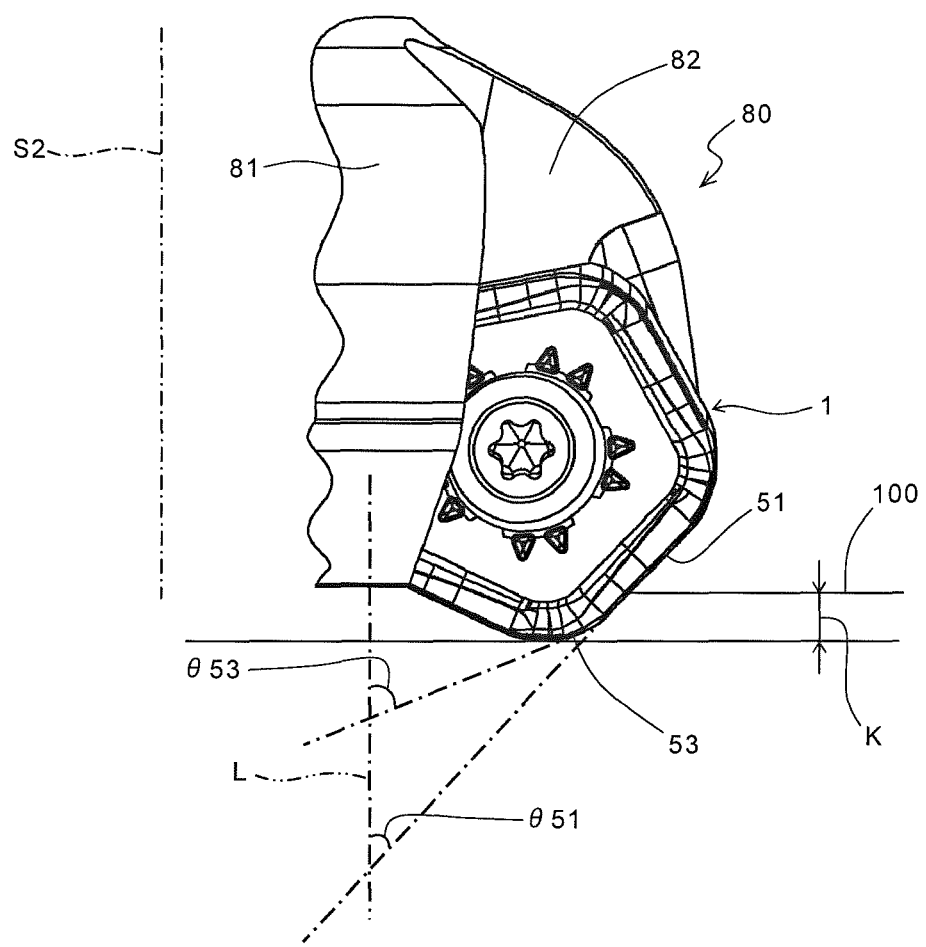
FIG. 10 is an enlarged view of major portion of the cutting tool in FIG. 9.

Next, a first embodiment of the cutting tool according to the present invention is described in detail with reference to FIGS. 9 and 10. As shown in FIGS. 9 and 10, the cutting tool 80 (rotary cutting tool) according to the present embodiment is configured to attach a plurality of inserts 1 to a holder 81.

To be specific, a plurality of circumferentially spaced insert pockets 82 are formed at a peripheral front end of the holder 81. These insert pockets 82 are portions obtained by cutting off the holder 81 into a substantially V-shape when viewed from the front end. The inserts 1 are respectively attached to a plurality of attachment surfaces 83 formed thereby.

For example, the attachment thereof is carried out by inserting an attachment screw 84 into the through hole 6 of each insert 1, and then screwing the attachment screw 84 into a female screw formed in the attachment surface 83 of the holder 81, or by allowing the attachment screw 84 to pass through a through hole formed in the holder 81, and then fixing it with a nut from the opposite side.

The insert 1 is attached to the holder 81 by orienting the upper surface 2 ahead in a rotation direction indicated by arrow A, and allowing the major cutting edge 51 to protrude from the periphery of the holder 81. In the present embodiment, the rotation axis S2 of the holder 81 is positioned substantially perpendicular to a surface of the workpiece 100 shown in FIG. 10. At this time, the major cutting edge 51 is inclined at an angle of approximately 45° with respect to the workpiece 100. In the cutting tool 80, cutting is carried out using the major cutting edge 51, the minor cutting edge 53, and the flat cutting edge 52 by rotating the holder 81 in a direction of arrow A around the rotation axis S2.

Second Embodiment

Figure 11:
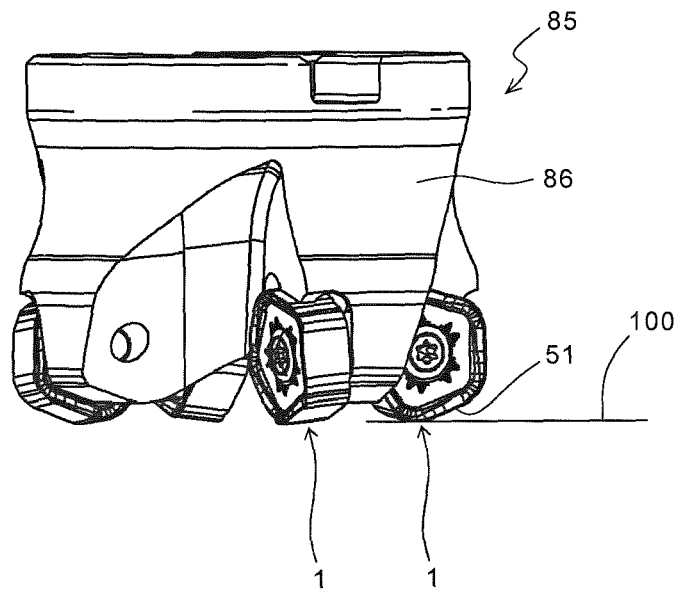
FIG. 11 is a side view showing a cutting tool according to a second embodiment of the present invention.

A second embodiment of the cutting tool according to the present invention is described in detail with reference to FIG. 11. In FIG. 11, the same components as the foregoing FIGS. 9 and 10 are identified by the same reference numerals, and the description thereof is omitted here.

As shown in FIG. 11, the cutting tool 85 according to the present embodiment is made up of a holder 86 having substantially the same configuration as the holder 81 according to the first embodiment, and the inserts 1 attached to the holder 86.

In the holder 86 of the present embodiment, the major cutting edge 51 of the insert 1 is brought into contact with the workpiece 100 at a relatively gentle inclination of approximately 30°. Axial rake angles of the major cutting edge 51 and the minor cutting edge 53 with respect to a rotation axis of the holder 86 are negative from the viewpoint of ensuring high strength of the cutting edge 5. In the present embodiment, the minor cutting edge 53 having the large peripheral cutting edge angle is interposed between the flat cutting edge 52 and the major cutting edge 51, thereby reducing cutting resistance in a region where these axial rake angles are apt to become negative. Additionally, compared to conventional inserts including only the major cutting edge and including no minor cutting edge, the cutting edge region has the so-called two-stage structure by interposing the minor cutting edge 53. Hence, the peripheral cutting edge angle of the major cutting edge 51 itself can be set relatively large, thereby effectively reducing the cutting resistance of the major cutting edge 51. Consequently, the cutting resistance of the cutting edge 5 (the major cutting edge 51 and the minor cutting edge 53) contributing to cutting can be effectively reduced as a whole.

The cutting tool 85 of the present embodiment also uses the foregoing inserts 1, thus providing the operation advantages of preventing breakage of corner portions and extending the life of the inserts 1. Other configurations are similar to those of the cutting tool 80 of the first embodiment, and therefore the description thereof is omitted here.

Third Embodiment

Figure 12:
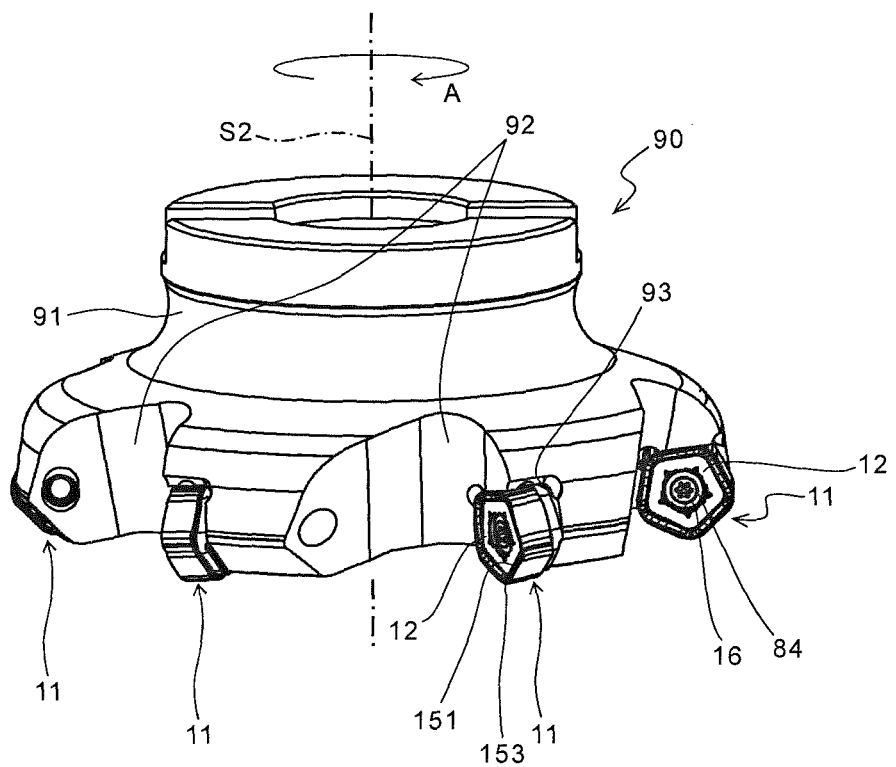
FIG. 12 is a perspective view showing a cutting tool according to a third embodiment of the present invention.

A third embodiment of the cutting tool according to the present invention is described in detail with reference to FIGS. 12 and 13. In FIGS. 12 and 13, the same components as the foregoing FIGS. 9 to 11 are identified by the same reference numerals, and the description thereof is omitted here. As shown in FIGS. 12 and 13, the cutting tool 90 according to the present embodiment is configured to attach a plurality of inserts 11 to a holder 91.

To be specific, a plurality of circumferentially spaced insert pockets 92 are formed at a peripheral front end of the holder 91 similarly to the holder 81 of the first embodiment. These inserts 1 are respectively attached to a plurality of attachment surfaces 93 of these insert pockets 92.

Each insert 11 is attached to the holder 91 by orienting the upper surface 12 ahead in the rotation direction indicated by arrow A, and allowing the major cutting edge 151 to protrude from the periphery of the holder 91. The insert 11 is preferably attached to the holder 91 in a state in which the major cutting edge 151 and the minor cutting edge 153 have a positive axial rake angle with respect to the rotation axis S2 of the holder 91. This is effective in reducing cutting resistance over the entire region of the major cutting edge 151 and the minor cutting edge 153.

In the cutting tool 90, cutting is carried out using the major cutting edge 151, the minor cutting edge 153, and the flat cutting edge 152 by rotating the holder 91 in the direction of arrow A around the rotation axis S2. Other configurations are similar to those of the cutting tool 80 of the first embodiment and the cutting tool 85 of the second embodiment, and therefore the description thereof is omitted here.

<Method of Manufacturing Machined Product>

An embodiment of the method of manufacturing a machined product according to the present invention is described in detail below with reference to FIG. 14, by taking the case of using the cutting tool 80.

Figure 14:
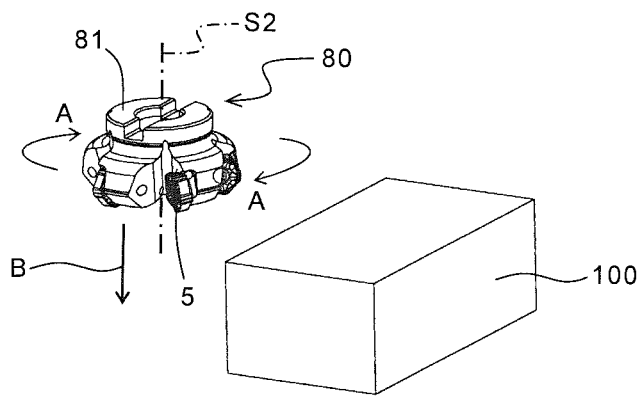
FIGS. 14(a) to 14(c) are process drawings showing a method of manufacturing a machined product according to an embodiment of the present invention.
Figure 14:
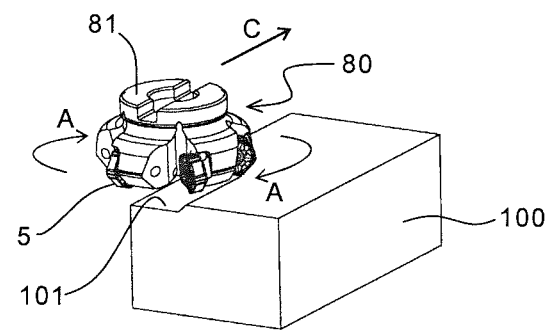
Figure 14:
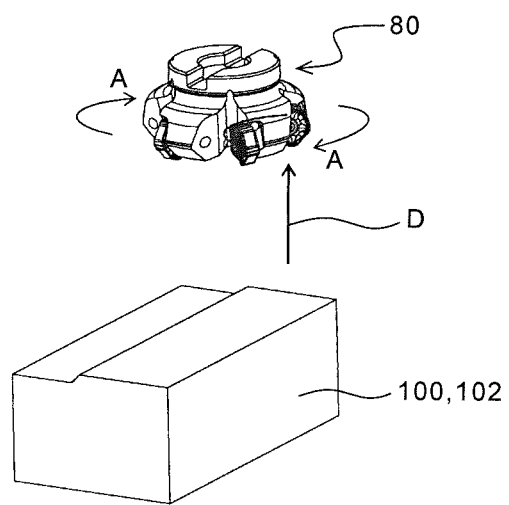

As shown in FIG. 14, the method of manufacturing the machined product according to the present embodiment includes the step of rotating the cutting tool 80; the step of bringing the cutting edges 5 of the rotating cutting tool 80 into contact with the workpiece 100; and the step of separating the cutting tool 80 from the workpiece 100.

To be specific, firstly, the inserts 1 are attached to the holder 81. At this time, these inserts 1 are attached to the insert pocket 82 of the holder 81 along the same circumference of the holder 81.

Subsequently, as shown in FIG. 14(*a*), the workpiece 100 is fixed to a bed or the like of a milling machine (not shown), and an appropriate depth of cut is set by moving the holder 81 in a direction of arrow B.

Subsequently, as shown in FIG. 14(*b*), the holder 81 is moved in a direction of arrow C while being rotated in a direction of arrow A around the rotation axis S2. This brings the major cutting edge 51 and the minor cutting edge 53 into contact with the workpiece 100 located ahead in a feed direction, thereby cutting the workpiece 100 according to the depth of cut.

At this time, the plurality of inserts 1 sequentially enter a cutting region and perform cutting, and therefore, an arcuate line (cutting trace) remains on the surface 101 of the workpiece 100. The arcuate line is cut by the flat cutting edge 52, thus smoothing the surface 101. As shown in FIG. 10, a part (lower part) of the major cutting edge 51 close to the minor cutting edge 53 actually cuts into the workpiece 100 by a predetermined depth of cut K.

Then, as shown in FIG. 14(*c*), after the cutting tool 80 passes through the workpiece 100, the cutting tool 80 is separated from the workpiece 100 by lifting the cutting tool 80 in a direction of arrow D.

When the cutting process is continued, the above cutting process may be repeated by bringing the cutting edges 5 into contact with the same portion or different portions of the workpiece 100 while retaining the rotation of the cutting tool 80. As a result, the machined product 102 can be obtained.

As described above, with the method of manufacturing the machined product according to the present embodiment, the operation in which the cutting tool 80 is rotated to allow the individual inserts 1 to contact and cut the workpiece 100, and is then separated from the workpiece 100, is repeated sequentially. These inserts 1 are therefore subjected to an impulsive force. The cutting tool 80 employs the inserts 1. Accordingly, when the major cutting edge 51 of each insert 1 cuts into the workpiece 100, the top portion P, which is properly separated from the corner portion in the vicinity of the boundary of the major cutting edge 51 and the minor cutting edge 53, is first brought into contact with the workpiece 100. Therefore, the corner portion is not subjected to any strong force, thus providing the advantage of reducing breakage of the corner portion that is relative weak. Additionally, the top portion P is smoothly protruded, and leads to a low risk of breakage thereof. Further, even when chips are brought into a strong sliding contact with the surfaces of the inserts 1, the chips are smoothly turned around and hence are not subjected to excessive force. This also contributes to life extension of the inserts 1.

When the cutting edge 5 in use is worn, an unused cutting edge 5 is used therefor by rotating the insert 1 around the center axis S1 thereof, or turning the insert 1 upside down. Similar effects are obtainable when the cutting tool 85 according to the second embodiment or the cutting tool 90 according to the third embodiment is used instead of the cutting tool 80.

While the several embodiments according to the present invention have been described and illustrated above, it is to be understood that the present invention is not limited to the foregoing embodiments and is applicable to any optional embodiments without departing from the gist of the present invention.

For example, in the inserts 1 according to the first embodiment, the top portion P of the cutting edge 5 is located at the major cutting edge 51 (refer to FIG. 3). The present invention, however, is not limited thereto. The top portion P may be located at the flat cutting edge 53, the minor cutting edge 52, or the corner cutting edges 54 to 56 in consideration of the relationship of the lengths and shapes of the individual cutting edges.

From the viewpoint of attrition wear and fracture of the cutting edges 5 caused by the impact force during the contact with the workpiece 100, and the sliding contact with the chips, it is preferable to position the top portion P at the minor cutting edge 52 or the major cutting edge 51 than to position it at the flat cutting edge 53 or the corner cutting edges 54 to 56. By positioning the top portion P in the middle of the long major cutting edge 51, the overall shape of the cutting edge 5 (the flat cutting edge 52, the minor cutting edge 53, and the major cutting edge 51) can be formed into a gently curved shape with the top portion P as a middle portion thereof. This is preferred from the viewpoint of the cutting edge strength.

Alternatively, the top portion P of the cutting edge 5 may be positioned in a portion in a region including the minor cutting edge 52 and the major cutting edge 51, except for the boundary region of the minor cutting edge 52 and the major cutting edge 51, or in a region except for the range between the minor cutting edge 52 and the major cutting edge 51. In this case, the top portion P is first brought into contact with the workpiece 100, and thereafter portions lower than the top portion P are sequentially brought into contact with the workpiece 100. This eliminates the probability that boundary portions having relatively low cutting edge strength come into sudden contact with the workpiece 100, thus achieving the life extension of the inserts 1.

In the foregoing embodiment of the method of manufacturing the machined product, the cutting tool is rotated and fed. Instead of this, the cutting tool is rotated, and the workpiece is fed and traveled. Alternatively, like a lathe, the cutting may be carried out by bringing the unrotated cutting tool into contact with the rotating workpiece. Examples of processing machines include face milling cutters, end mills, milling machines, and drills. The inserts according to the foregoing embodiments of the present invention can be used by attaching them to holders or chucks of these different types of processing machines.

The invention claimed is:

1. A cutting insert, comprising:
   an upper surface;
   a lower surface;
   a side surface; and
   a cutting edge which is located in an intersection region of the upper surface and the side surface, and comprises a major cutting edge, a flat cutting edge, and a minor cutting edge located between the major cutting edge and the flat cutting edge, wherein
   the cutting edge comprises sequentially, in a side view,
      an ascending portion inclined upward from the flat cutting edge to the major cutting edge with respect to a reference plane perpendicular to a central axis of the cutting insert,
      a top portion connected to the ascending portion, and
      a descending portion connected to the top portion and inclined downward with respect to the reference plane, and
   a peripheral cutting edge angle of the minor cutting edge is larger than a peripheral cutting edge angle of the major cutting edge.

2. The cutting insert according to claim 1, wherein the top portion of the cutting edge is located a portion in a region including the minor cutting edge and the major cutting edge, except for a boundary region of the minor cutting edge and the major cutting edge.

3. The cutting insert according to claim 1, wherein the top portion of the cutting edge is located in the major cutting edge.

4. The cutting insert according to claim 1, wherein the cutting edge is located between the minor cutting edge and the major cutting edge, and further comprises a corner cutting edge connected to the minor cutting edge and the major cutting edge.

5. The cutting insert according to claim 1, wherein
   the upper surface comprises a rake surface located inward the cutting edge,
   the side surface comprises a first side surface, a second side surface, and a third side surface which are located sequentially in a direction along the cutting edge,
   the flat cutting edge is located in an intersection region of the third side surface and the upper surface,
   the minor cutting edge is located in an intersection region of the second side surface and the upper surface, and is inclined at an inclination angle $\theta 1$ with respect to the flat cutting edge in a top view,
   the major cutting edge is located in an intersection region of the first side surface and the upper surface, and is inclined at an inclination angle $\theta 2$ with respect to the flat cutting edge in the top view, wherein,
   the rake surface comprises
      a first rake surface comprising a first major rake surface located inward the major cutting edge and a first minor rake surface located inward the minor cutting edge, which are inclined downward at a rake angle $\alpha$ with respect to the reference plane from a side of the cutting edge toward an inward portion,
   an inward side of the first minor rake surface is inclined at an inclination angle $\theta 3$ with respect to the minor cutting edge, and an inward side of the first major rake surface is inclined at an inclination angle $\theta 4$ with respect to the major cutting edge in the top view, and the inclination angles $\theta 1$ to $\theta 4$ satisfy relationships of $\theta 1 > \theta 2$ and $\theta 3 < \theta 4$.

6. The cutting insert according to claim 5, wherein a distance from the minor cutting edge to the inward side of the first minor rake surface is constant in a region of an entire length of the minor cutting edge.

7. The cutting insert according to claim 5, wherein a distance from the cutting edge to the inward side of the rake surface is constant in a region from the minor cutting edge to the major cutting edge.

8. The cutting insert according to claim 5, wherein the rake angle $\alpha$ is increased from the minor cutting edge to the major cutting edge.

9. The cutting insert according to claim 5, wherein
   the rake surface further comprises a second rake surface located inward the first rake surface, and is inclined downward at a rake angle $\beta$ with respect to the reference plane from a side of the first rake surface toward an inward portion, and
   the rake angle $\beta$ is smaller than the rake angle $\alpha$.

10. The cutting insert according to claim 9, wherein a width of the second rake surface is decreased from a side of the minor cutting edge to a side of the major cutting edge.

11. The cutting insert according to claim 9, wherein at least one of the first rake surface and the second rake surface is a plane.

12. The cutting insert according to claim 9, wherein the rake surface is located between the first rake surface and the second rake surface, and further comprises a curved intermediate rake surface connected to the first rake surface and the second rake surface.

13. The cutting insert according to claim 9, wherein at least one of the first rake surface and the second rake surface is a curved surface.

14. The cutting insert according to claim 9, wherein the rake angle $\beta$ is increased from the minor cutting edge to the major cutting edge.

15. The cutting insert according to claim 9, wherein a difference between the rake angle $\alpha$ and the rake angle $\beta$ is larger than 3° in a sectional view perpendicular to the cutting edge.

16. The cutting insert according to claim 9, wherein the upper surface further comprises a flat surface, wherein the flat surface is located inward the second rake surface and is located lower than the second rake surface in a sectional view perpendicular to the cutting edge.

17. The cutting insert according to claim 16, wherein
   the upper surface further comprises
      a wall surface which is located between the flat surface and the second rake surface and is connected to the flat surface and the second rake surface, wherein the wall surface is inclined downward at a chip clearance angle $\gamma$ with respect to the reference plane from a side of the cutting edge toward an inward portion, and
   the chip clearance angle $\gamma$ is larger than the rake angle $\beta$.

18. The cutting insert according to claim 5, wherein
   the rake surface further comprises
      a land portion which is located between the cutting edge and the first rake surface and is inclined at a land angle $\delta$ with respect to the reference plane toward inward the first rake surface, and
   the land angle $\delta$ is smaller than the rake angle $\alpha$.

19. A cutting tool, comprising:
   a cutting insert according to claim 1; and
   a holder configured to attach the cutting insert thereto.

20. The cutting tool according to claim 19, wherein the cutting insert is attached to the holder in a state that the major cutting edge and the minor cutting edge have a positive axial rake angle with respect to a rotation axis of the holder.

21. A method of manufacturing a machined product, comprising:

rotating a cutting tool according to claim 19;
bringing the cutting edge of the rotating cutting tool into contact with a workpiece; and
separating the cutting tool from the workpiece.

* * * * *